US009343101B2

(12) United States Patent
 Suzuki et al.

(10) Patent No.: US 9,343,101 B2
(45) Date of Patent: May 17, 2016

(54) HARD DISK DRIVE LOW PROFILE DISK CLAMP TO TIED-SHAFT MOTOR ASSEMBLY

(71) Applicant: HGST Netherlands B.V., Amsterdam (NL)

(72) Inventors: Takao Suzuki, Yokohama (JP); Masakazu Sasaki, Yamato (JP); Eriko Iwase, Yokohama (JP); Yasuhiro Sakata, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/309,533

(22) Filed: Jun. 19, 2014

(65) Prior Publication Data
US 2015/0371675 A1 Dec. 24, 2015

(51) Int. Cl.
 *G11B 17/02* (2006.01)
 *G11B 17/028* (2006.01)
 *G11B 19/20* (2006.01)
(52) U.S. Cl.
 CPC ............ *G11B 17/02* (2013.01); *G11B 17/0284* (2013.01); *G11B 19/2009* (2013.01)
(58) Field of Classification Search
 USPC ................ 360/98.01, 98.08, 99.08, 99.12
 See application file for complete search history.

(56) References Cited

U.S. PATENT DOCUMENTS

| 5,200,866 | A | | 4/1993 | Fruge et al. |
| 5,400,197 | A | | 3/1995 | Jabbari et al. |
| 5,517,376 | A | * | 5/1996 | Green ..................... 360/98.08 |
| 5,694,269 | A | * | 12/1997 | Lee ........................ 360/98.08 |
| 6,316,853 | B1 | | 11/2001 | MacLeod |
| 6,366,427 | B1 | * | 4/2002 | West ...................... 360/99.12 |
| 6,375,357 | B2 | | 4/2002 | Miura et al. |
| 7,589,935 | B2 | | 9/2009 | Kim |
| 8,149,535 | B2 | | 4/2012 | Li et al. |
| 8,760,800 | B1 | * | 6/2014 | Brown et al. ............ 360/99.12 |
| 2014/0211343 | A1 | * | 7/2014 | Kodama .................. 360/224 |
| 2014/0254046 | A1 | * | 9/2014 | Kodama et al. ......... 360/99.08 |

OTHER PUBLICATIONS

Thitima Jintanawan et al., Vibration Analysis of Fluid Dynamic Bearing Spindles with Rotating-Shaft Design, IEEE Transactions on Magnetics, Mar. 2001, pp. 799-804, vol. 37 No. 2.

* cited by examiner

*Primary Examiner* — Carlos E Garcia
(74) *Attorney, Agent, or Firm* — John D. Henkhaus (57) ABSTRACT

A hard disk drive is described, including a low-profile disk clamp to tied-shaft spindle/spindle motor assembly, in which a clamping nut is threaded onto a threaded spindle sleeve and a stationary shaft screw, or tied-shaft, penetrates through the HDD cover and into a shaft. The disk clamp may include a central opening for centering about the sleeve by way of the outer diameter of the clamping nut mating with the outer diameter of the clamp opening.

19 Claims, 10 Drawing Sheets

HARD DISK DRIVE LOW PROFILE DISK CLAMP TO TIED-SHAFT MOTOR ASSEMBLY

FIELD OF EMBODIMENTS

Embodiments of the invention may relate generally to hard disk drives and more particularly to a disk clamp and tied-shaft motor assembly.

BACKGROUND

A hard-disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator. A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present goals of hard disk drive design evolution. Further, the continuing evolution of HDDs has led to HDDs having thinner and thinner profiles. For example, the evolution of HDD profiles included 9.5 mm (height) HDDs, then 7 mm HDDs, and on to even thinner HDDs, while at the same time increasing the storage capacity and maintaining standard form factors (i.e., the "footprint" of an HDD) for installation in computing and data storage devices. Therefore, there are continuous design challenges associated with the evolution of HDDs to thinner profiles and more capacity, such as spatial challenges due to decreasing volumes within which to enclose HDD components. For example, in thinner mobile drives, especially in 2-disk models, there is not much design and performance margin with respect to spindle motor stiffness, such as in the context of shock and vibration robustness.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward a hard disk drive ("HDD") disk clamp to tied-shaft spindle/spindle motor assembly, and a method of clamping a disk to a tied-shaft spindle/spindle motor, using a clamping nut threaded onto a threaded spindle sleeve. According to an embodiment, a stationary shaft screw (or "tied-shaft") penetrates through the HDD cover and into a shaft.

According to an embodiment, the disk clamp has a central opening for positioning about the sleeve and is centered about the sleeve by the outer diameter of the clamping nut mating with the outer diameter of the clamp opening. According to an embodiment, the threaded spindle sleeve and corresponding hub are an integrated component and, according to another embodiment, the threaded spindle sleeve and corresponding hub are separate components.

Embodiments discussed in the Summary of Embodiments section are not meant to suggest, describe, or teach all the embodiments discussed herein. Thus, embodiments of the invention may contain additional or different features than those discussed in this section. Furthermore, no limitation, element, property, feature, advantage, attribute, or the like expressed in this section, which is not expressly recited in a claim, limits the scope of any claim in any way.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to a hard disk drive disk clamp to tied-shaft spindle/spindle motor motor assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

Physical Description of Illustrative Embodiments

Figure 1:
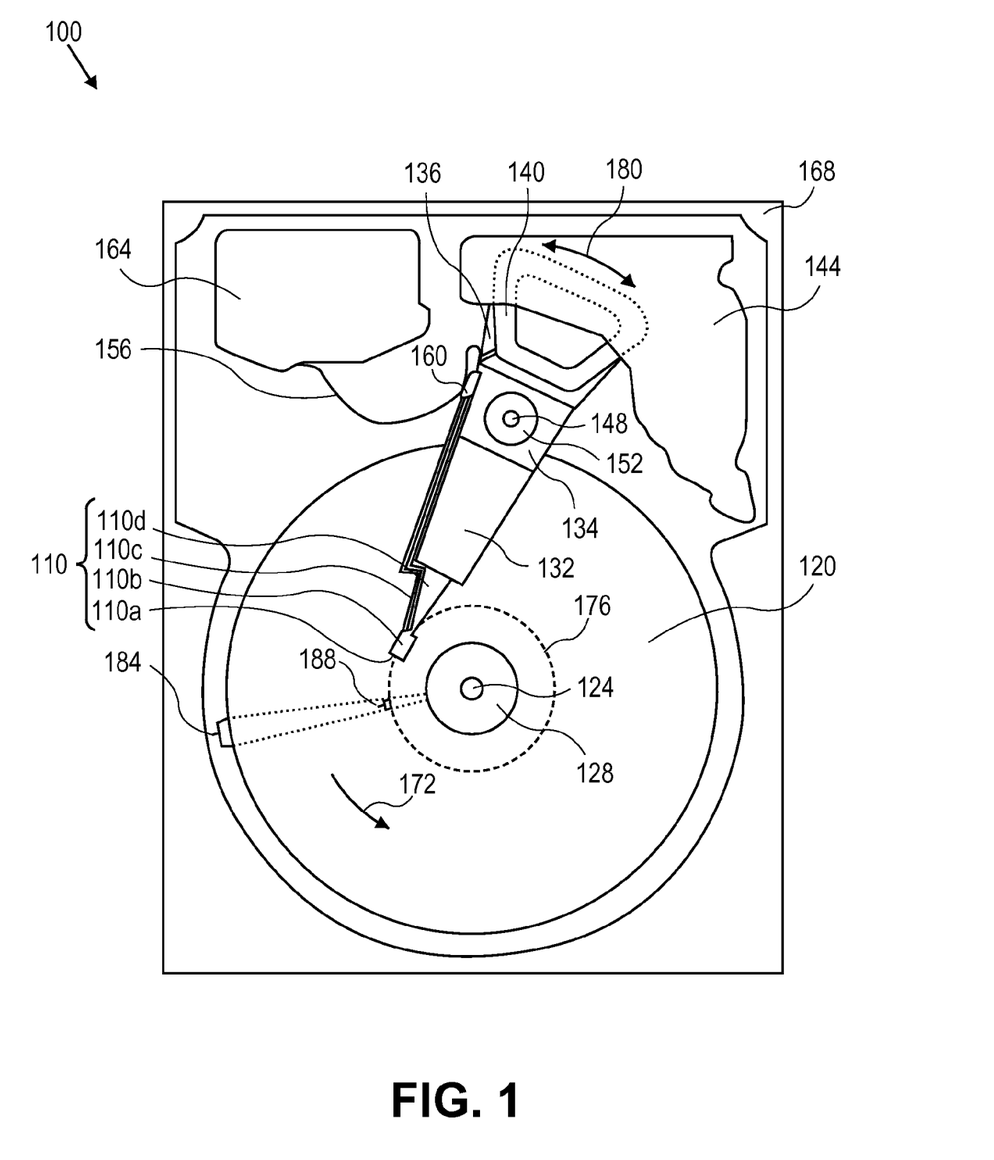
FIG. 1 is a plan view illustrating a hard disk drive (HDD), according to an embodiment of the invention.

Embodiments of the invention may be used in the context of a hard-disk drive (HDD) disk clamp arrangement. Thus, in accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110, to access portions of the media 120, being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions (or "track sector"), for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

As mentioned, in thinner mobile drives, especially in 2-disk models, there is not much design and performance margin with respect to spindle/spindle motor stiffness, such as in the context of shock and vibration robustness. This is due in part to the use of rotational-shaft type spindle/spindle motor assemblies that are typically used in mobile HDD products.

However, another spindle/spindle motor type referred to as a "tied-shaft" motor can provide more stiffness and strength, useful in such contexts as operational shock, operational vibration, and swing-gyro moment, for example. However, introducing a tied-shaft motor into a mobile drive poses challenges with respect to the disk clamping method, at least in part because the tied-shaft does not rotate and because of the spatial limitations of fitting an enclosure base, spindle/spindle motor, disk clamp and attachment, and top cover within a low profile (e.g., 7 mm) space.

One potential approach to implementation of a tied-shaft motor assembly into a HDD may involve the use of multiple screws (e.g., 3 to 6) to attach the disk clamp to the spindle near the outer diameter of the disk clamp. However, the screw tap (i.e., threads) are located above the motor-disk stack assembly and require a certain amount of depth for proper securing, which may lead to an inability to adjust the motor to the appropriate height position, which could lead to significant motor vibration and insufficient motor torque. Another potential approach to attaching the disk clamp to the spindle may involve the use of a relatively large nut to attach to the outer diameter of the spindle hub which, being near the disk, may cause generation of material particles which can contaminate the HDD and damage the disk and/or read/write head, and which may also make disk balancing (centering about the spindle) difficult. Thus, neither of the foregoing approaches are optimal or problem-free, and an approach that fixes the disk clamp nearer the rotational center of the spindle/spindle motor is a desirable improvement over the foregoing approaches.

A Disk Clamp to Tied-Shaft Spindle/Spindle Motor Assembly

Figure 2A:
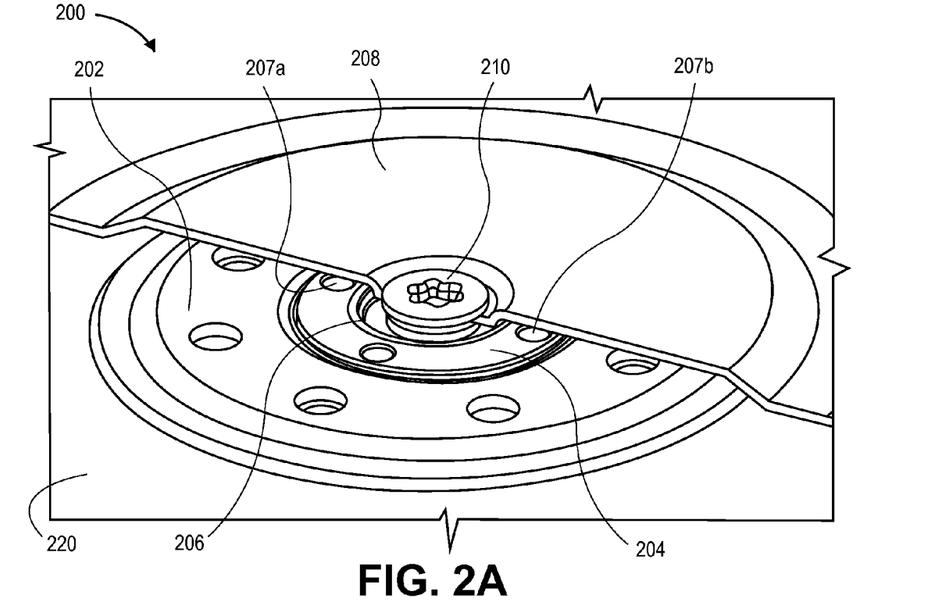
FIG. 2A is a partial cut-away perspective view illustrating a disk clamp to tied-shaft motor assembly, according to an embodiment of the invention.

FIG. 2A is a partial cut-away perspective view illustrating a disk clamp to tied-shaft motor assembly, according to an embodiment of the invention. FIG. 2A depicts an assembly 200, comprising a disk clamp 202 attached to and substantially centered about a hub-sleeve 206 by a clamping nut 204. Assembly 200 further comprises a cover 208, through which a stationary shaft screw 210 (e.g., a tied-shaft) penetrates, where the shaft screw 210 extends into a central shaft.

Figure 2B:
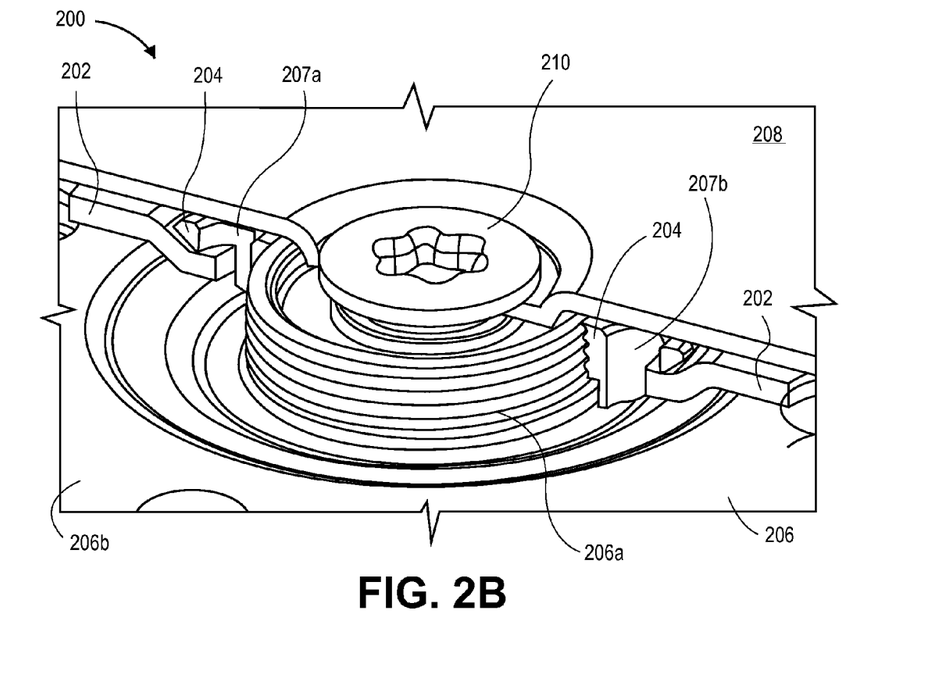
FIG. 2B is a cut-away perspective view illustrating the disk clamp to tied-shaft motor assembly of FIG. 2A, according to an embodiment of the invention.

Continuing with reference to assembly 200, FIG. 2B is a cut-away perspective view illustrating the disk clamp to tied-shaft motor assembly of FIG. 2A, according to an embodiment of the invention. FIG. 2B depicts the assembly 200, showing a cut-away of the disk clamp 202 attached to and substantially centered about the hub-sleeve 206, more specifically attached to the hub-sleeve 206 via a threaded spindle sleeve 206a, by the clamping nut 204 which is also shown in a cut-away view. Note that the cut-away view of clamping nut 204 is cut through a tooling hole 207a, 207b, on each side of an annular rim of sleeve 206a, where tooling hole 207a, 207b are for mating with a nut-tightening tool according to an embodiment. Alternatively, or additionally, clamping nut 204 may comprise a hexagonal rim configured for mating with a nut-tightening tool.

Figure 2C:
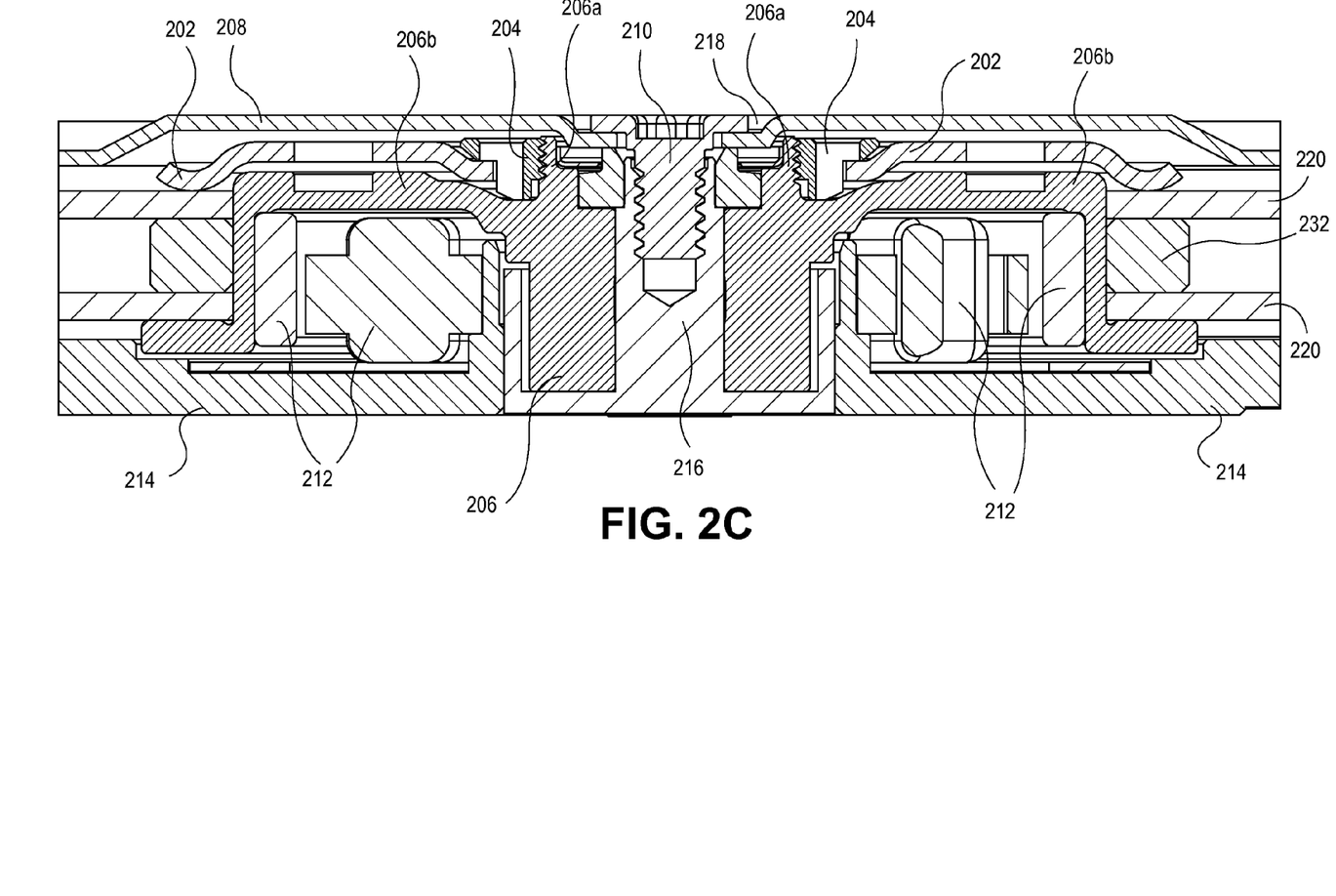
FIG. 2C is a cross-sectional view illustrating an HDD comprising the disk clamp to tied-shaft motor assembly of FIG. 2A, according to an embodiment of the invention.

Similarly as discussed in reference to FIG. 2A, assembly 200 further comprises a cover 208, through which a stationary shaft screw 210 (e.g., a tied-shaft) penetrates, where the shaft screw 210 extends into a central shaft 216 (FIG. 2C). In addition to comprising a threaded spindle sleeve 206a, hub-sleeve 206 also comprises a hub 206b that extends radially outward from the threaded spindle sleeve 206a.

FIG. 2C is a cross-sectional view illustrating an HDD comprising the disk clamp to tied-shaft motor assembly of FIG. 2A, according to an embodiment of the invention. FIG. 2C depicts the assembly 200 (FIGS. 2A, 2B), comprising the disk clamp 202 coupled to the hub-sleeve 206 and being sandwiched between the clamping nut 204 and the disk 220. Disk clamp 202 extends radially beyond the upper portion of spindle hub 206b to apply a clamping force, or spring force, to the disk 220 by way of annular contact with the disk, which affixes the disk 220 to the hub-sleeve 206. The clamping force applied to the disk 220 originates by threading the clamping nut 204 onto the threaded sleeve 206a of hub-sleeve 206. In HDDs configured with multiple disks 220, a spacer 232 is positioned between adjacent disks 220 to facilitate transfer of the clamping force from one disk to the next adjacent disk. An electrical signal provided to a magnetic circuit 212 enables the magnetic circuit 212 to spin, providing a torque to the hub-sleeve 206 which is in turn transmitted to the one or more disk 220 that is affixed to the hub-sleeve 206 by the disk clamp 202, thereby spinning the disk 220 as needed for data read and write operations.

Also depicted in FIG. 2C is the cover 208, which is attached to an enclosure base 214, and through which the stationary shaft screw 210 penetrates and whereby the shaft screw 210 extends into a central shaft 216. It is this shaft screw 210 that is "tied", i.e., stationary, about which the hub-sleeve 206 rotates under the driving force of the magnetic circuit 212 embedded within the spindle hub 206b. Further, and according to an embodiment, cover 208 comprises a recessed area 218 for receiving and recessing the clamping nut 204.

Figure 3:
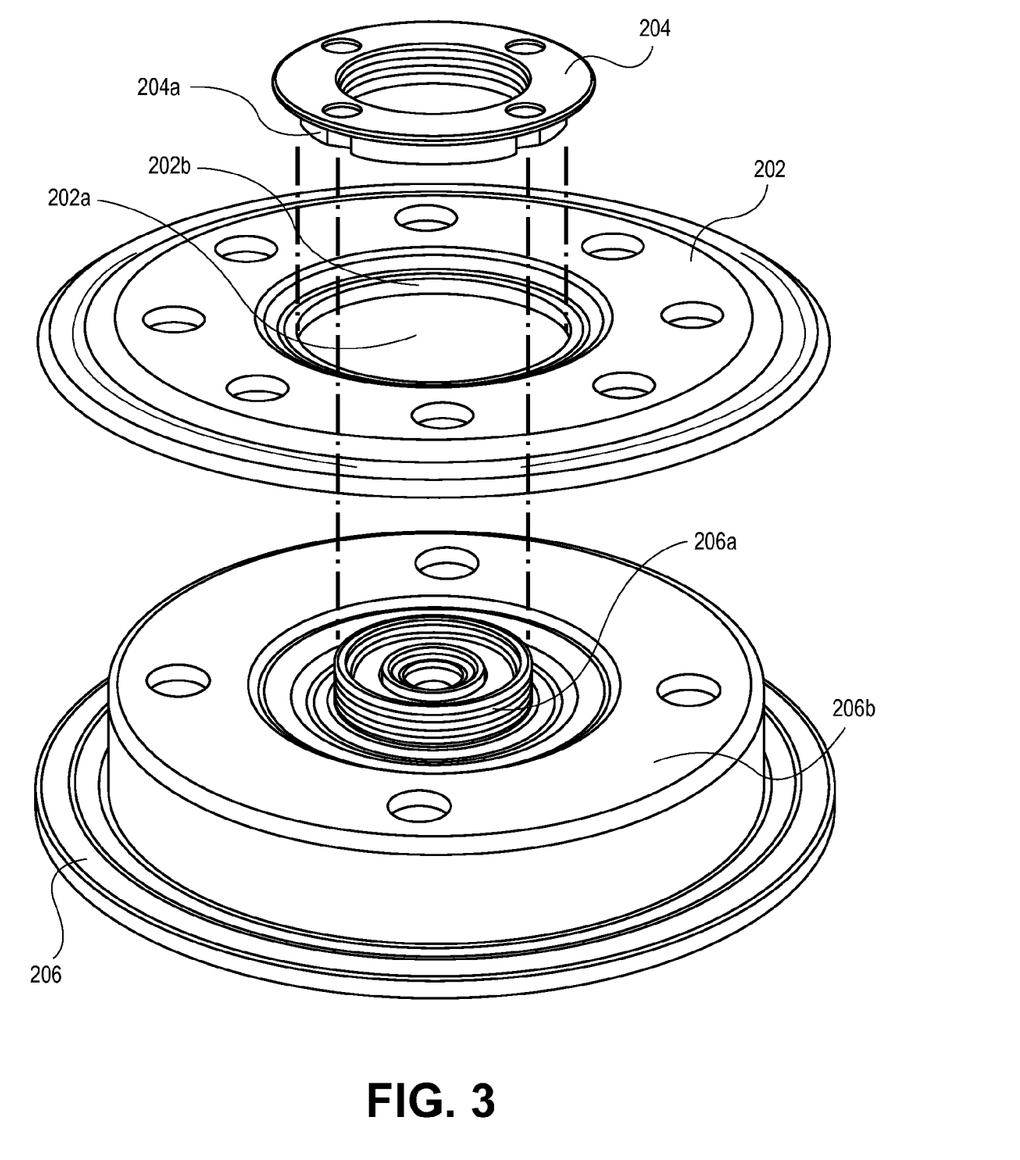
FIG. 3 is an exploded view illustrating a disk clamp to spindle/spindle motor assembly, according to an embodiment of the invention.

FIG. 3 is an exploded view illustrating a disk clamp to spindle/spindle motor assembly, according to an embodiment of the invention. FIG. 3 illustrates the coupling of the disk clamp 202 to the hub-sleeve 206 by threading the clamping nut 204 onto the threaded sleeve 206a and thereby sandwiching the disk clamp 202. Further, clamping nut 204 comprises an outer diameter 204a of the main body and disk clamp 202 comprises a central opening 202a configured for positioning the disk clamp about the threaded sleeve 206a of hub-sleeve 206. Disk clamp 202 is centered about the threaded sleeve 206a, and thus about the hub-sleeve 206, by way of the outer diameter 204a of the clamping nut 204 mating with the outer diameter 202b of the opening 202a of disk clamp 202, according to an embodiment.

Based on the foregoing described embodiments, a disk clamp (e.g., disk clamp 202) may secure a disk (e.g., disk 220) onto a spindle (e.g., hub-sleeve 206) by forcing means close to the rotational center of the spindle/spindle motor rather than at the outer area of the disk clamp, thereby reducing the likelihood of generating contaminating particles from using multiple outer diameter disk clamp fasteners nearer the disk, and does so in a low profile but stiff manner by using a tied-shaft (e.g., shaft screw 210) motor rather than a rotational-shaft motor.

Spindle Hub-Sleeve Constructions

Figure 4A:
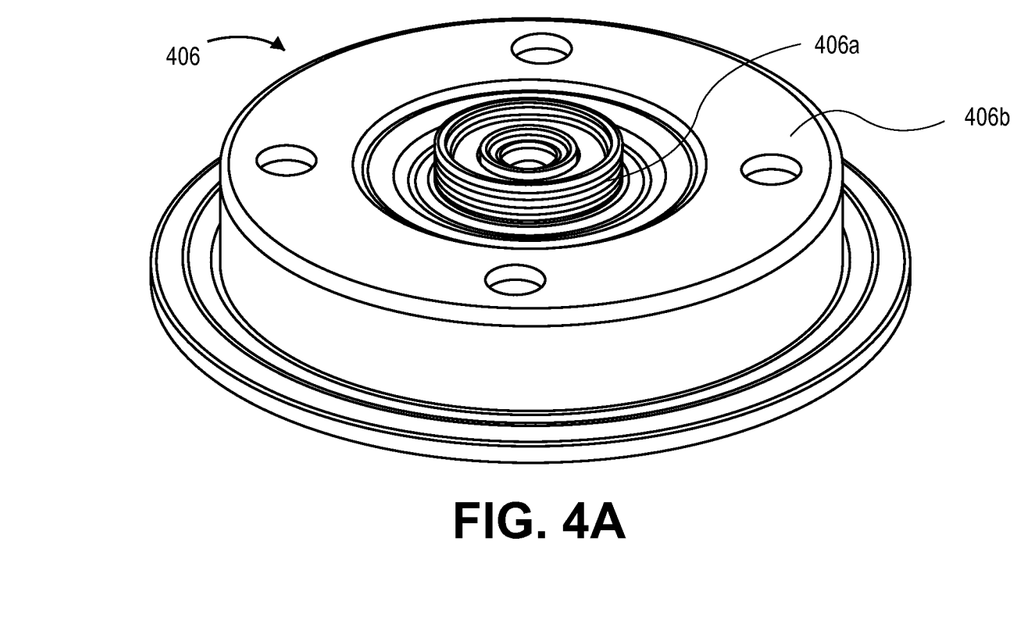
FIG. 4A is a perspective view illustrating a disk spindle/spindle motor, according to an embodiment of the invention.
Figure 4B:
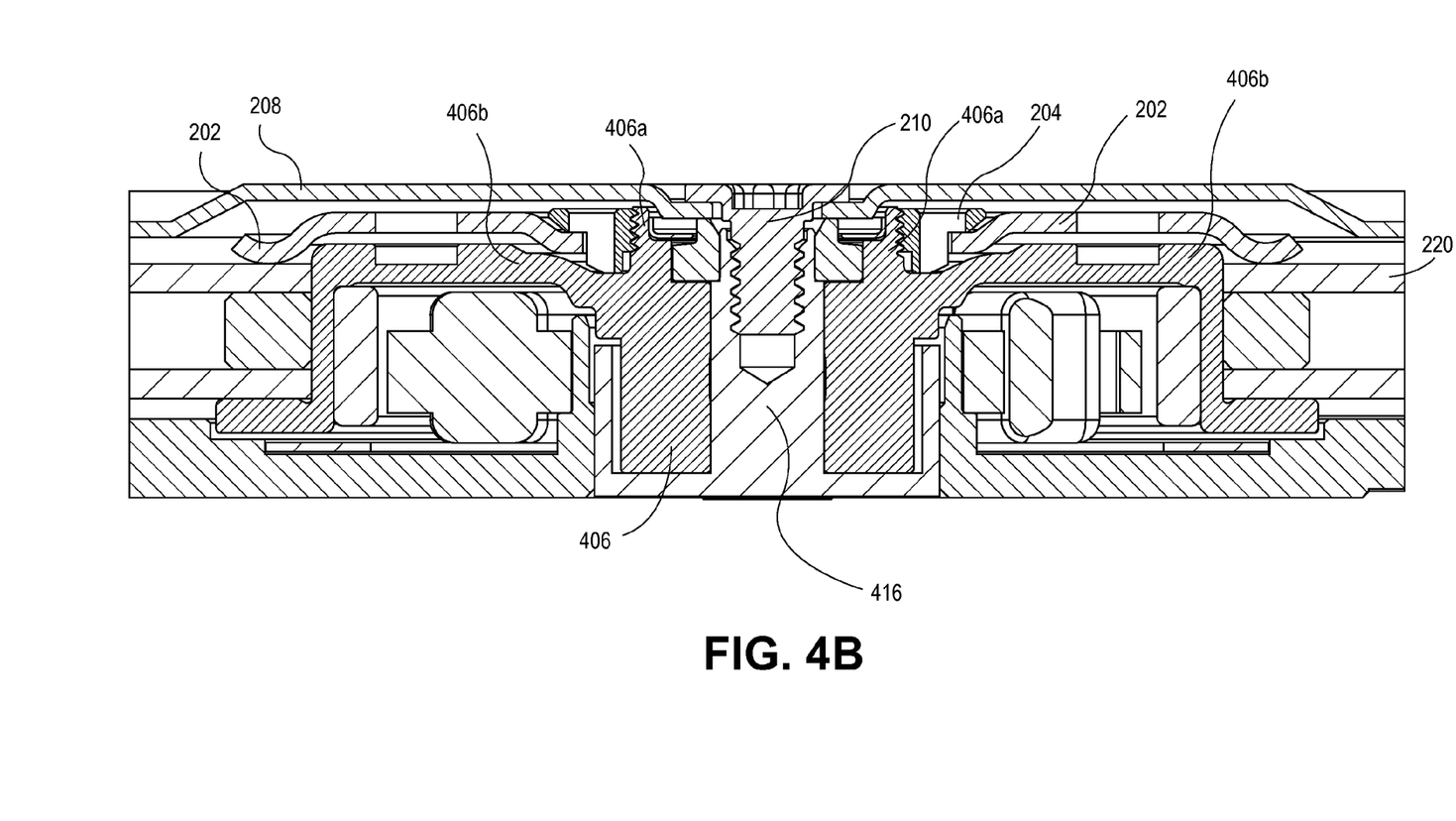
FIG. 4B is a cross-sectional view illustrating an HDD comprising the spindle/spindle motor of FIG. 4A, according to an embodiment of the invention.

FIG. 4A is a perspective view illustrating a disk spindle/spindle motor, and FIG. 4B is a cross-sectional view illustrating an HDD comprising the spindle/spindle motor of FIG. 4A, both according to an embodiment of the invention. With this embodiment, the hub-sleeve construction of spindle 406 comprises a threaded sleeve 406a and corresponding hub 406b in an integrated, unitary construction.

Similarly to FIG. 2C, FIG. 4B depicts the disk clamp 202 coupled to the spindle 406 via threaded sleeve 406a and being sandwiched between the clamping nut 204 and the disk 220, where the disk clamp 202 extends radially beyond the upper portion of spindle hub 406b to apply a clamping force to the disk 220 by way of annular contact with the disk which affixes the disk 220 to the spindle 406. Also depicted in FIG. 4B is the cover 208, through which the stationary shaft screw 210 penetrates and whereby the shaft screw 210 extends into a central shaft 416.

As recording tracks in HDDs become narrower and narrower and bits are recorded smaller and smaller, there is a need for more accurate and sustainable head positioning, sometimes referred to as "track following". One of the factors impairing precise track following is repeatable runout (RRO), which generally refers to the deviation of the head from the theoretical perfect circle of the track. An integrated spindle such as spindle 406 would be expected to result in better (i.e., less) RRO due in part to its more rigid integrated structure. However, such performance may come at the expense of a shorter screw tap length for the threaded sleeve 406a due to the limited tool path available to tap the sleeve 406a, i.e., manufacturing limitations.

Figure 5A:
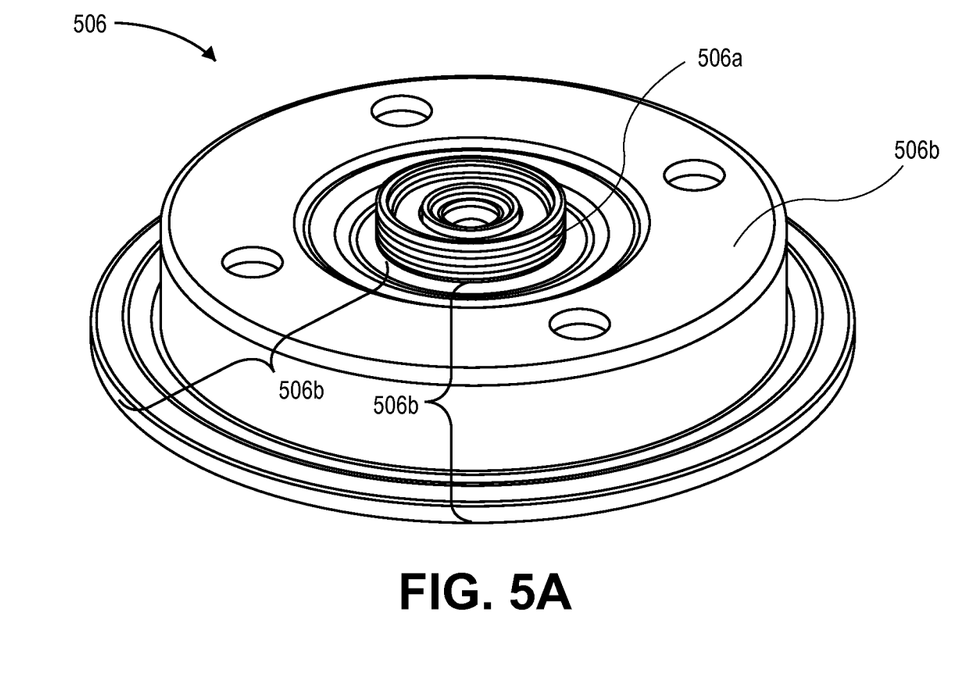
FIG. 5A is a perspective view illustrating a 2-piece disk spindle/spindle motor assembly, according to an embodiment of the invention.
Figure 5B:
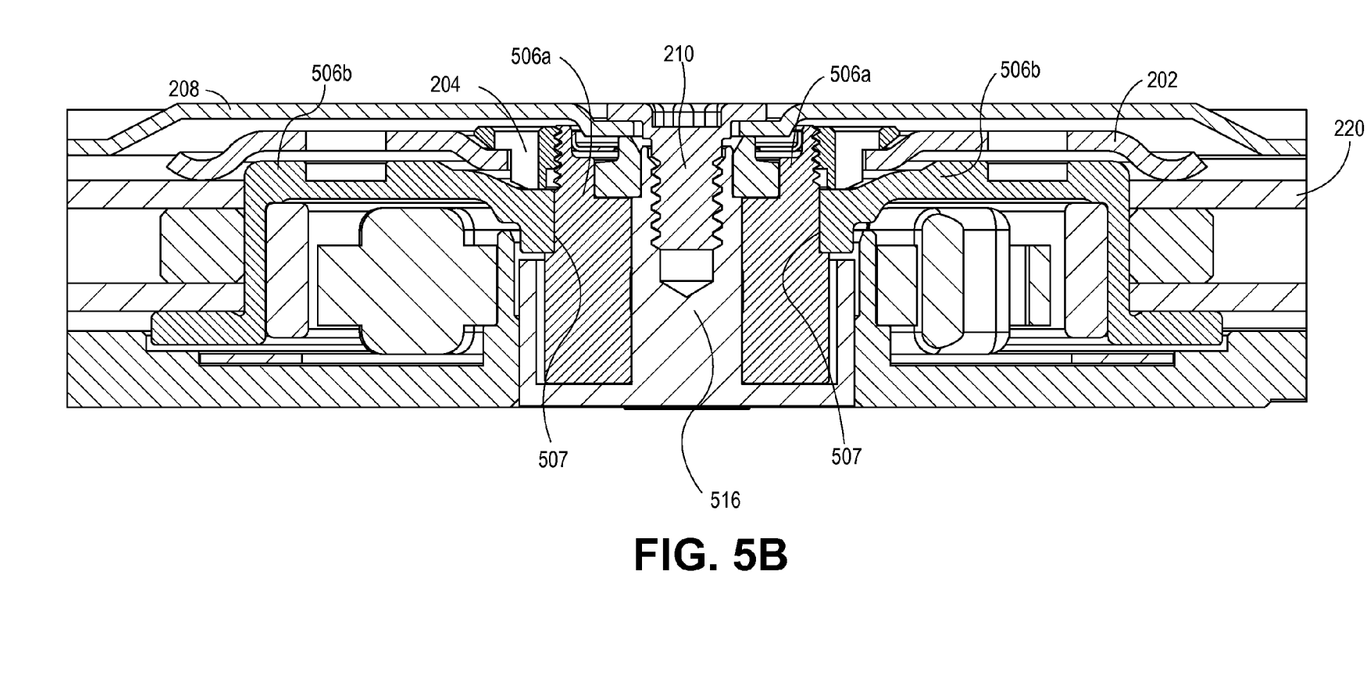
FIG. 5B is a cross-sectional view illustrating an HDD comprising the spindle/spindle motor assembly of FIG. 5A, according to an embodiment of the invention.

An alternative spindle hub-sleeve construction is described in reference to FIG. 5A which is a perspective view illustrating a 2-piece disk spindle/spindle motor assembly, and in reference to FIG. 5B which is a cross-sectional view illustrating an HDD comprising the spindle/spindle motor assembly of FIG. 5A, both according to an embodiment of the invention. With this embodiment, the hub-sleeve construction of spindle 506 comprises a threaded sleeve 506a and corresponding hub 506b in two-piece construction.

Similarly to FIG. 2C, FIG. 5B depicts the disk clamp 202 coupled to the spindle 506 via threaded sleeve 506a and being sandwiched between the clamping nut 204 and the disk 220, where the disk clamp 202 extends radially beyond the upper portion of spindle hub 506b to apply a clamping force to the disk 220 by way of annular contact with the disk which affixes the disk 220 to the spindle 506. Also depicted in FIG. 5B is the cover 208, through which the stationary shaft screw 210 penetrates and whereby the shaft screw 210 extends into a central shaft 516. As depicted in FIG. 5B, the threaded sleeve 506a is a separate component from the corresponding hub 506b, noting the interface of these components at interface 507.

According to an embodiment, the threaded sleeve 506a and the hub 506b are bonded together at interface 507, such as with an adhesive. Alternatively and according to an embodiment, the threaded sleeve 506a and the hub 506b are press fit together at interface 507.

Figure 5C:
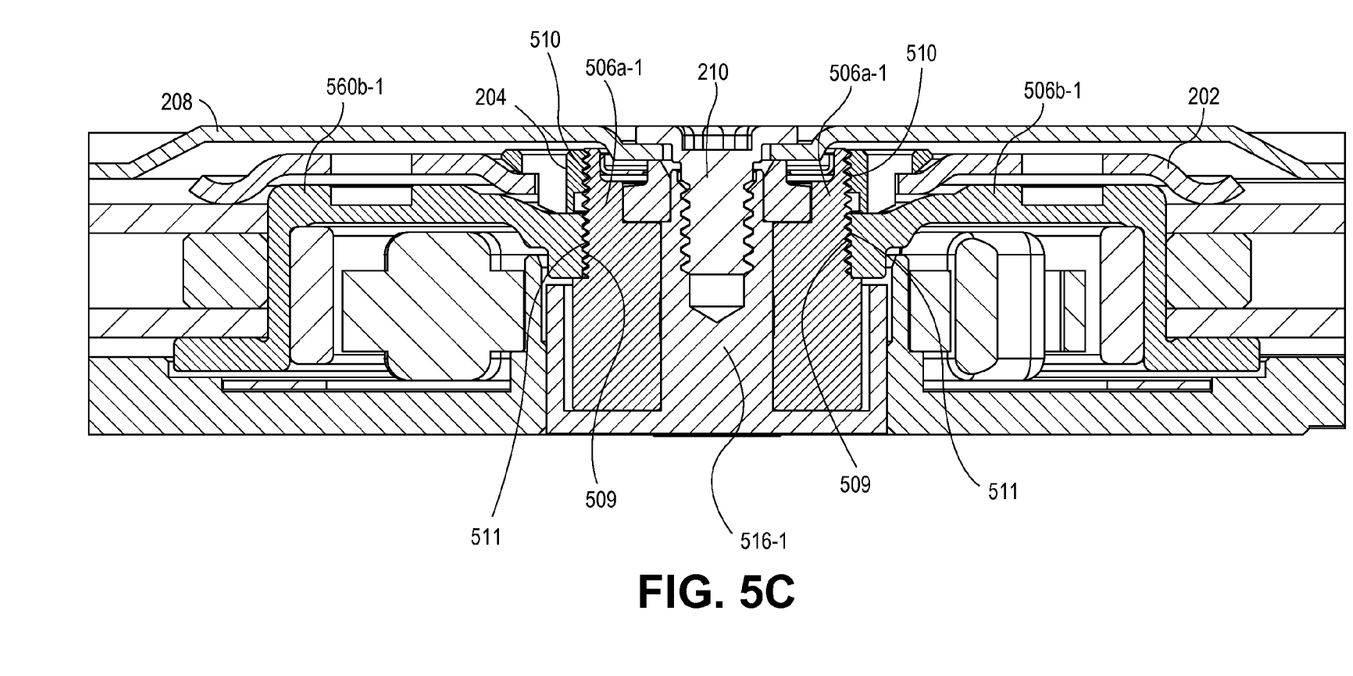
FIG. 5C is a cross-sectional view illustrating an HDD comprising the spindle/spindle motor assembly of FIG. 5A, according to an embodiment of the invention.

FIG. 5C is a cross-sectional view illustrating an HDD comprising the spindle/spindle motor assembly of FIG. 5A, according to an embodiment of the invention. Similarly to FIG. 2C, FIG. 5C again depicts the disk clamp 202 coupled to the spindle 506 via threaded sleeve 506a-1 and being sandwiched between the clamping nut 204 and the disk 220, where the disk clamp 202 extends radially beyond the upper portion of spindle hub 506b to apply a clamping force to the disk 220 by way of annular contact with the disk which affixes the disk 220 to the spindle 506. Also depicted in FIG. 5C is the cover 208, through which the stationary shaft screw 210 penetrates and whereby the shaft screw 210 extends into a central shaft 516-1. As depicted in FIG. 5C, the threaded sleeve 506a-1 is a separate component from the corresponding hub 506b, noting the interface of these components at interface 509.

Rather than being bonded or press fit together as in the embodiment illustrated and described in reference to FIG. 5B, with the embodiment illustrated in FIG. 5C the threaded sleeve 506a-1 comprises an upper set of threads 510 for threading the clamping nut 204 thereon, and a lower set of threads 511 for threading the hub 506b-1 thereon.

A two-piece spindle such as spindle 506 would be expected to result in a similar RRO as provided by a rotational shaft type spindle/spindle motor assembly, ensuring a suitable screw tap length for affixing the clamping nut 204 to the threaded sleeve 506a and/or the threaded sleeve 506a-1.

Method for Clamping a Disk Media to a Tied-Shaft Spindle/Spindle Motor

Figure 6:
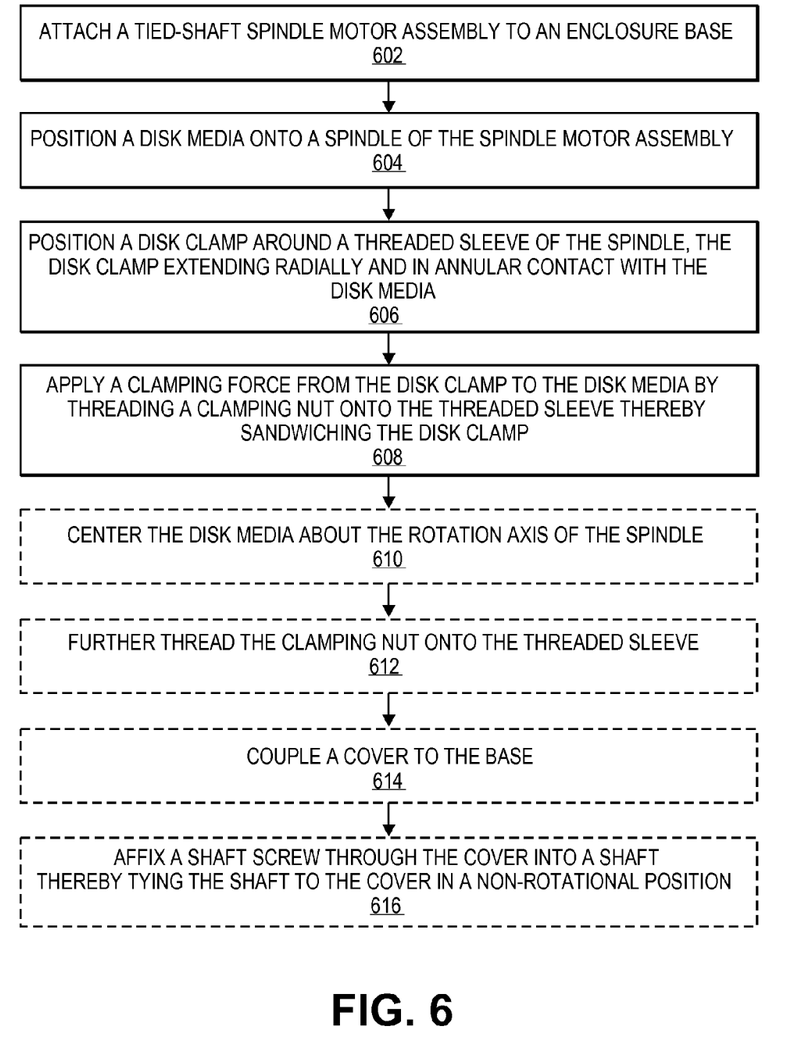
FIG. 6 is a flowchart illustrating a method for clamping a disk media to a tied-shaft spindle/spindle motor motor, according to an embodiment of the invention.

FIG. 6 is a flowchart illustrating a method for clamping a disk media to a tied-shaft spindle/spindle motor, according to an embodiment of the invention. For example, the method illustrated in FIG. 6 may be practiced in the context of clamping a disk media 120 (FIG. 1) to spindle 124 (FIG. 1) in an HDD 100 (FIG. 1).

At block 602 a tied-shaft spindle/spindle motor assembly is attached to an enclosure base. For example, a spindle motor assembly comprising hub-sleeve 206 (FIG. 2C) and magnetic circuit 212 (FIG. 2C) is attached to enclosure base 214 (FIG. 2C) using one or more fasteners, an adhesive, interlocked or press fit, and the like.

At block 604 a disk media is positioned onto a spindle of the spindle/spindle motor assembly. For example, disk 220 (FIG. 2C) is positioned onto hub-sleeve 206 (FIG. 2C) of the spindle/spindle motor assembly.

At block 606 a disk clamp is positioned around a threaded sleeve of the spindle, whereby the disk clamp extends radially and in annular contact with the disk media. For example, disk clamp 202 (FIG. 2C) is positioned around a threaded sleeve 206a (FIG. 2C) of the hub-sleeve 206 (FIG. 2C), whereby the disk clamp 202 extends radially (see, e.g., FIG. 2A, FIG. 3) and in annular contact with the disk 220 (see, e.g., FIG. 2C).

At block 608 a clamping force is applied from the disk clamp to the disk media by threading a clamping nut onto the threaded sleeve, thereby sandwiching the disk clamp between the clamping nut and the spindle hub. For example, a clamping force is applied from the disk clamp 202 (FIG. 2C) to the disk 220 (FIG. 2C) by threading a clamping nut 204 (FIG. 2C) onto the threaded sleeve 206a (FIG. 2C), thereby sandwiching the disk clamp 202 between the clamping nut 204 and the spindle hub 206b (FIG. 2C) and/or spacer 232 (FIG. 2C). Consequently, the disk clamp 202 applies a spring-like clamping force to the disk 220, thereby clamping the disk 220 onto the hub-sleeve 206 (FIG. 2C).

According to an embodiment, the threading of the clamping nut onto the threaded sleeve constitutes a preliminary fastening of the clamping nut onto the sleeve. At optional block 610 (depicted as optional in FIG. 6 by a dashed block border), the disk media is centered about the rotation axis of the spindle/spindle motor, also referred to as "disk balancing". For example, disk 220 (FIG. 2C) is centered about the rotation axis of the hub-sleeve 206 (FIG. 2C), which is generally coincident with the radial center of the spindle/spindle motor assembly. At optional block 612 the clamping nut is further threaded onto the threaded sleeve. For example, clamping nut 204 (FIG. 2C) is further threaded onto the threaded sleeve 206a (FIG. 2C) of hub-sleeve 206, thereby fixedly fastening the disk clamp 202 (FIG. 2C) and disk 220 onto the hub-sleeve 206.

According to an embodiment, at optional block 614 a cover is coupled to the enclosure base. For example, cover 208 (FIG. 2C) is attached to enclosure base 214 (FIG. 2C) using a plurality of fasteners (e.g., screws), or adhesive, or the like, thereby enclosing the clamping nut 204, disk clamp 202, disk 220, and spindle motor assembly (e.g., spindle sleeve 206a, spindle hub 206b, magnetic circuit 212, all of FIG. 2C). At optional block 616 a shaft screw is affixed through the cover into a shaft, thereby tying the shaft to the cover in a non-rotational position. For example, shaft screw 210 (FIG. 2C) is affixed through the cover 208 into a shaft 216 (FIG. 2C), thereby tying the shaft 216 to the cover 208 in a non-rotational position, i.e., producing a "tied-shaft" spindle/spindle motor assembly.

In the foregoing specification, embodiments of the invention have been described with reference to numerous specific details that may vary from implementation to implementation. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive comprising:
   a magnetic-recording disk mounted on a hub-sleeve, said hub-sleeve comprising (a) a threaded sleeve having a shaft and (b) a hub extending radially from said threaded sleeve;
   a disk clamp coupled with said hub-sleeve and substantially centered about said sleeve for annular contact with said disk;
   a clamping nut threaded onto said threaded sleeve over said disk clamp, said clamping nut comprising an annular rim comprising a plurality of non-threaded tooling holes;
   a cover coupled to an enclosure base; and
   a stationary shaft screw penetrating through said cover and into said shaft of said sleeve.

2. The hard disk drive of claim 1, further comprising a spindle drive motor configured to rotate said hub-sleeve and said disk about said stationary shaft screw.

3. The hard disk drive of claim 1, wherein said threaded sleeve and said hub of said hub-sleeve are an integrated component.

4. The hard disk drive of claim 1, wherein said hub-sleeve comprises said threaded sleeve as a separate component from said hub.

5. The hard disk drive of claim 4, wherein said threaded sleeve comprises an upper set of threads for threading said clamping nut thereon and a lower set of threads for threading said hub thereon.

6. The hard disk drive of claim 4, wherein said hub and said threaded sleeve are coupled together via an adhesive bond.

7. The hard disk drive of claim 4, wherein said hub and said threaded sleeve are coupled together via a mechanical press-fit.

8. The hard disk drive of claim 1, wherein said cover comprises a recessed area for receiving and recessing said clamping nut.

9. The hard disk drive of claim 1, wherein said disk clamp comprises a central opening for positioning said disk clamp about said sleeve and is centered about said sleeve by the outer diameter of said clamping nut mating with the outer diameter of said central opening of said disk clamp.

10. The hard disk drive of claim 1, wherein said annular rim comprises a hexagonal rim configured for mating with a nut-tightening tool for tightening said clamping nut onto said threaded sleeve.

11. A method for clamping a disk medium to a tied-shaft spindle motor, the method comprising:
    attaching a tied-shaft spindle motor assembly to an enclosure base;
    positioning a disk medium onto a hub-sleeve of said spindle motor assembly;
    positioning a disk clamp around a threaded sleeve of said hub-sleeve, said disk clamp extending radially and in annular contact with said disk medium;
    applying a clamping force from said disk clamp to said disk medium by threading a clamping nut onto said threaded sleeve using a plurality of non-threaded tooling holes, thereby sandwiching said disk clamp; and
    affixing a screw into a threaded central shaft of said tied-shaft spindle motor assembly to prevent rotation of said central shaft.

12. The method of claim 11, wherein threading said clamping nut comprises a preliminary fastening of said clamping nut to said threaded sleeve, the method further comprising:
    centering said disk medium about the rotation axis of said hub-sleeve; and
    further threading said clamping nut onto said threaded sleeve.

13. The method of claim 12, further comprising:
    prior to affixing said screw, coupling a cover to said enclosure base, thereby enclosing said clamping nut, disk clamp, disk medium, and spindle motor assembly; and
    wherein affixing said screw includes affixing said screw through said cover into said threaded central shaft, thereby tying said threaded central shaft to said cover in a non-rotational position.

14. A hard disk drive comprising:
    a recording disk;
    a tied-shaft spindle motor comprising a non-rotational central shaft and a threaded sleeve; and
    clamping nut means comprising tightening tooling mating means and threaded onto said threaded sleeve to clamp said recording disk onto said tied-shaft spindle motor;
    wherein said threaded sleeve comprises and upper set of threads for threading thereon said clamping nut means and a lower set of threads for threading thereon a hub extending radially from said threaded sleeve.

15. The hard disk drive of claim 14, wherein said clamping nut means is threaded onto said threaded sleeve close to the rotational center of said tied-shaft spindle motor.

16. A hard disk drive comprising:
    a magnetic-recording disk mounted on a hub-sleeve, said hub-sleeve comprising (a) a threaded sleeve having a shaft and (b) a hub extending radially from said threaded sleeve;
    a disk clamp coupled with said hub-sleeve and substantially centered about said sleeve for annular contact with said disk;
    a clamping nut threaded onto said threaded sleeve over said disk clamp;
    a cover coupled to an enclosure base; and
    a stationary shaft screw penetrating through said cover and into said shaft of said sleeve;
    wherein said threaded sleeve is configured as a separate component from said hub and comprises an upper set of threads for threading said clamping nut thereon and a lower set of threads for threading said hub thereon.

17. The hard disk drive of claim 16, wherein said clamping nut comprises a hexagonal rim configured for mating with a nut-tightening tool for tightening said clamping nut onto said threaded sleeve.

18. A hard disk drive comprising:
    a magnetic-recording disk mounted on a hub-sleeve, said hub-sleeve comprising (a) a threaded sleeve having a shaft and (b) a hub extending radially from said threaded sleeve;
    a disk clamp coupled with said hub-sleeve and substantially centered about said sleeve for annular contact with said disk;
    a clamping nut threaded onto said threaded sleeve over said disk clamp, said clamping nut comprising a hexagonal rim configured for mating with a nut-tightening tool for tightening said clamping nut onto said threaded sleeve;
    a cover coupled to an enclosure base; and
    a stationary shaft screw penetrating through said cover and into said shaft of said sleeve.

19. The hard disk drive of claim 18, wherein said threaded sleeve is configured as a separate component from said hub and comprises an upper set of threads for threading said clamping nut thereon and a lower set of threads for threading said hub thereon.

\* \* \* \* \*